(12) United States Patent
Cheng et al.

(10) Patent No.: US 10,992,589 B2
(45) Date of Patent: Apr. 27, 2021

(54) LTE BASED V2X COMMUNICATION QOS AND CONGESTION MITIGATION

(71) Applicant: QUALCOMM Incorporated, San Diego, CA (US)

(72) Inventors: Hong Cheng, Bridgewater, NJ (US); Michaela Vanderveen, Tracy, CA (US); Haris Zisimopoulos, London (GB); Sudhir Kumar Baghel, Hillsborough, NJ (US); Shailesh Patil, Raritan, NJ (US); Libin Jiang, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 484 days.

(21) Appl. No.: 15/400,185

(22) Filed: Jan. 6, 2017

(65) Prior Publication Data

US 2017/0201461 A1    Jul. 13, 2017

Related U.S. Application Data

(60) Provisional application No. 62/277,859, filed on Jan. 12, 2016.

(51) Int. Cl.
*H04L 12/823* (2013.01)
*H04L 12/26* (2006.01)
(Continued)

(52) U.S. Cl.
CPC ............. *H04L 47/32* (2013.01); *H04L 43/16* (2013.01); *H04L 47/24* (2013.01); *H04L 47/286* (2013.01);
(Continued)

(58) Field of Classification Search
CPC ......... H04L 47/32; H04L 43/16; H04L 47/24; H04L 47/286; H04L 47/12; H04L 47/11; H04W 72/10
(Continued)

(56) References Cited

U.S. PATENT DOCUMENTS 6,226,685 B1 * 5/2001 Chen ..................... H04L 49/203
                                                    370/390
7,188,025 B2    3/2007 Hudson et al.
(Continued)

FOREIGN PATENT DOCUMENTS

CN    101359407 A    2/2009
EP    3119113 A1    1/2017
(Continued)

OTHER PUBLICATIONS

Bauza R., et al., "Road Traffic Congestion Detection through Cooperative Vehicle-to-Vehicle Communications", Local Computer Networks(LCN), 2010 IEEE 35th Conference on IEEE, XP031986834, Oct. 10, 2010, pp. 606-612.
(Continued)

*Primary Examiner* — Faisal Choudhury
(74) *Attorney, Agent, or Firm* — Procopio, Cory, Hargreaves & Savitch LLP/Qualcomm

(57) ABSTRACT

Methods and apparatus for configuring a UE to assist in mitigating network congestion include determining whether a data packet has expired based on a first parameter, which indicates an expiration of the data, and adjusting a transmission of the data packet based on the determination of whether the data packet has expired. In some aspects, the UE may drop the data packet upon determination that the data packet has expired. The UE may be configured detect to a first congestion level, receive a second congestion level from a second UE, and process a frame for transmission
(Continued)

based on the first or second congestion level. The UE may be configured determine a priority, generate a data packet that includes a destination parameter or a source parameter, adjust radio resource parameters based on the destination parameter or source parameter, and transmit data packets according to adjusted radio resources.

19 Claims, 9 Drawing Sheets

(51) Int. Cl.
H04L 12/851 (2013.01)
H04W 72/10 (2009.01)
H04L 12/841 (2013.01)
H04L 12/801 (2013.01)
H04W 4/70 (2018.01)
H04W 28/02 (2009.01)
H04L 29/08 (2006.01)
H04W 84/18 (2009.01)

(52) U.S. Cl.
CPC ......... H04W 72/10 (2013.01); H04L 43/0876 (2013.01); H04L 47/11 (2013.01); H04L 47/12 (2013.01); H04L 67/12 (2013.01); H04W 4/70 (2018.02); H04W 28/0284 (2013.01); H04W 28/0289 (2013.01); H04W 84/18 (2013.01)

(58) Field of Classification Search
USPC ........................................... 370/230
See application file for complete search history.

(56) References Cited

U.S. PATENT DOCUMENTS

| | | | |
|---|---|---|---|
| 8,494,709 B2 | 7/2013 | Hamada et al. | |
| 9,185,045 B1 | 11/2015 | Yang et al. | |
| 2003/0142696 A1* | 7/2003 | Holmeide | H04L 12/427 370/508 |
| 2004/0160922 A1* | 8/2004 | Nanda | H04L 1/0002 370/335 |
| 2007/0076600 A1 | 4/2007 | Ekl et al. | |
| 2007/0232230 A1* | 10/2007 | Anke | H04W 72/10 455/39 |
| 2009/0122808 A1* | 5/2009 | Sharif-Ahmadi | H04L 47/10 370/458 |
| 2009/0233606 A1* | 9/2009 | Park | H04L 1/1832 455/437 |
| 2010/0238801 A1 | 9/2010 | Smith et al. | |
| 2011/0038378 A1* | 2/2011 | Carter | H04L 69/26 370/400 |
| 2011/0059756 A1* | 3/2011 | Moeglein | G01S 5/0236 455/456.5 |
| 2011/0085455 A1 | 4/2011 | Wu et al. | |
| 2012/0105637 A1 | 5/2012 | Yousefi | |
| 2012/0127981 A1* | 5/2012 | Verma | H04W 74/08 370/338 |
| 2013/0103781 A1 | 4/2013 | Mori et al. | |
| 2014/0226677 A1* | 8/2014 | Mendes Alves da Costa | H04L 1/1838 370/417 |
| 2015/0036487 A1 | 2/2015 | Sakata et al. | |
| 2016/0066164 A1* | 3/2016 | Steinbach | H04L 51/066 455/411 |
| 2016/0135242 A1* | 5/2016 | Hampel | H04W 76/14 370/329 |
| 2016/0185358 A1* | 6/2016 | Todasco | B60W 50/12 701/48 |
| 2016/0293133 A1* | 10/2016 | Dutt | A63F 13/57 |
| 2017/0034667 A1 | 2/2017 | Kumabe et al. | |

FOREIGN PATENT DOCUMENTS

| | | |
|---|---|---|
| GB | 2471347 A | 12/2010 |
| WO | 2015139268 A1 | 9/2015 |
| WO | 2015149576 A1 | 10/2015 |
| WO | 2015162851 A1 | 10/2015 |
| WO | 2015171066 A1 | 11/2015 |
| WO | 2016039906 A1 | 3/2016 |
| WO | 2017027355 A1 | 2/2017 |

OTHER PUBLICATIONS

International Search Report and Written Opinion—PCT/US2017/012728—ISA/EPO—dated Jun. 7, 2017.

Milojevic M., et al., "Short Paper: Distributed Vehicular Traffic Congestion Detection Algorithm for Urban Environments", 2013 IEEE Vehicular Networking Conference, IEEE, XP032567229, Dec. 16, 2013, pp. 182-185.

Leister W., "Hikernet Peer-to-Peer Messaging in an Ad-Hoc Network", Norsk Regnesentral Norwegian Computing Center, Dec. 1, 2004 (Dec. 1, 2004), XP055211218, 11 pages. Retrieved from the Internet: URL: http://publications.nr.no/directdownload/publications.nr.no/3999/Leister-Hikernet.pdf.

Partial International Search Report and Written Opinion—PCT/US2017/012728—ISA/EPO—dated Apr. 10, 2017.

Taiwan Search Report—TW106100665—TIPO—dated Oct. 12, 2020.

* cited by examiner

LTE BASED V2X COMMUNICATION QOS AND CONGESTION MITIGATION

CROSS-REFERENCE TO RELATED APPLICATION(S)

This application claims the benefit of U.S. Provisional Application Ser. No. 62/277,859, entitled "LTE BASED V2X COMMUNICATION QOS AND CONGESTION MITIGATION" and filed on Jan. 12, 2016, which is expressly incorporated by reference herein in its entirety.

BACKGROUND

Field

The present disclosure relates generally to communication systems, and more particularly, to a vehicle-to-everything (V2X) communication.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In particular, LTE may be configured to support device-to-device (D2D) communication, vehicle-to-vehicle (V2V) communication, and/or vehicle-to-everything (V2X) communication utilizing proximity-based services (ProSe), which may include devices configured to interface with the vehicle-to-infrastructure/network (V2I/N) (e.g., vehicle-to-pedestrian (V2P), pedestrian-to-vehicle (P2V), road side unit (RSU)). In these instances, vehicles may perform message transmissions using resources assigned by the network (e.g. eNB, or RSU) or pre-configured for V2X use.

In some circumstances, due to the potentially limited radio resources for the V2X communication, V2X may be unable to accommodate all the messages exchanged simultaneously. As such, LTE and in particular V2X, would benefit from congestion mitigation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus determines at least one priority parameter associated with a data packet. The at least one priority parameter includes a first parameter that indicates an expiration of the data packet. In addition, the apparatus determines whether the data packet has expired based on the first parameter. Further, the apparatus adjusts a transmission of the data packet based on the determination of whether the data packet has expired.

In an aspect, the apparatus may be a UE. The apparatus includes means for determining at least one priority parameter associated with a data packet, the at least one priority parameter including a first parameter that indicates an expiration of the data packet. The apparatus includes means for determining whether the data packet has expired based on the first parameter. The apparatus includes means for adjusting a transmission of the data packet based on the determination of whether the data packet has expired.

In an aspect, the apparatus may be a UE for wireless communication that includes a memory and at least one processor coupled to the memory. The at least one processor is configured to: determine at least one priority parameter associated with a data packet, the at least one priority parameter including a first parameter that indicates an expiration of the data packet, determine whether the data packet has expired based on the first parameter, and adjust a transmission of the data packet based on the determination of whether the data packet has expired.

In an aspect, a computer-readable medium storing computer executable code for a UE includes code to: determine at least one priority parameter associated with a data packet, the at least one priority parameter including a first parameter that indicates an expiration of the data packet, determine whether the data packet has expired based on the first parameter, and adjust a transmission of the data packet based on the determination of whether the data packet has expired.

In another aspect of the disclosure, a method, a computer-readable medium, and an apparatus are provided. The apparatus may be a UE. The apparatus determines a first congestion level for a set of resources. In addition, the apparatus receives information from a second UE indicating a second congestion level for the set of resources. Further, the apparatus processes a frame for transmission based on the first congestion level and the second congestion level.

In an aspect, the apparatus may be a UE. The apparatus includes means for determining, at a UE, a first congestion level for a set of resources. The apparatus includes means for receiving information from a second UE that indicates a second congestion level for the set of resources. The apparatus includes means for processing a frame for transmission is configured to process the frame based on the first congestion level and the second congestion level.

In an aspect, the apparatus may be a UE for wireless communication that includes a memory and at least one processor coupled to the memory. The at least one processor is configured to: determine a first congestion level for a set of resources, receive information from a second UE that indicates a second congestion level for the set of resources, process a frame for transmission based on the first congestion level and the second congestion level.

In an aspect, a computer-readable medium storing computer executable code for a UE includes code to: determine a first congestion level for a set of resources, receive information from a second UE that indicates a second congestion level for the set of resources, process a frame for transmission based on the first congestion level and the second congestion level.

In another aspect of the disclosure, a method, a computer-readable medium, and an apparatus are provided. The apparatus may be a UE. The apparatus generates a data packet that includes at least one of a destination parameter or a source parameter. In addition, the apparatus adjusts one or more radio resource parameters based on the at least one of the destination parameter or the source parameter. Further, the apparatus transmits one or more data packets according to the one or more adjusted radio resource parameters.

In an aspect, the apparatus may be a UE. The apparatus includes means for generating a data packet, wherein the data packet includes at least one of a destination parameter or a source parameter. The apparatus includes means for adjusting one or more radio resource parameters based on the at least one of the destination parameter or the source parameter. The apparatus includes means for transmitting one or more data packets according to the one or more adjusted radio resource parameters.

In an aspect, the apparatus may be a UE for wireless communication that includes a memory and at least one processor coupled to the memory. The at least one processor is configured to: generate a data packet that includes at least one of a destination parameter or a source parameter, adjust one or more radio resource parameters based on the at least one of the destination parameter or the source parameter, and transmit one or more data packets according to the one or more adjusted radio resource parameters.

In an aspect, a computer-readable medium storing computer executable code for a UE includes code to: generate a data packet that includes at least one of a destination parameter or a source parameter, adjust one or more radio resource parameters based on the at least one of the destination parameter or the source parameter, and transmit one or more data packets according to the one or more adjusted radio resource parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
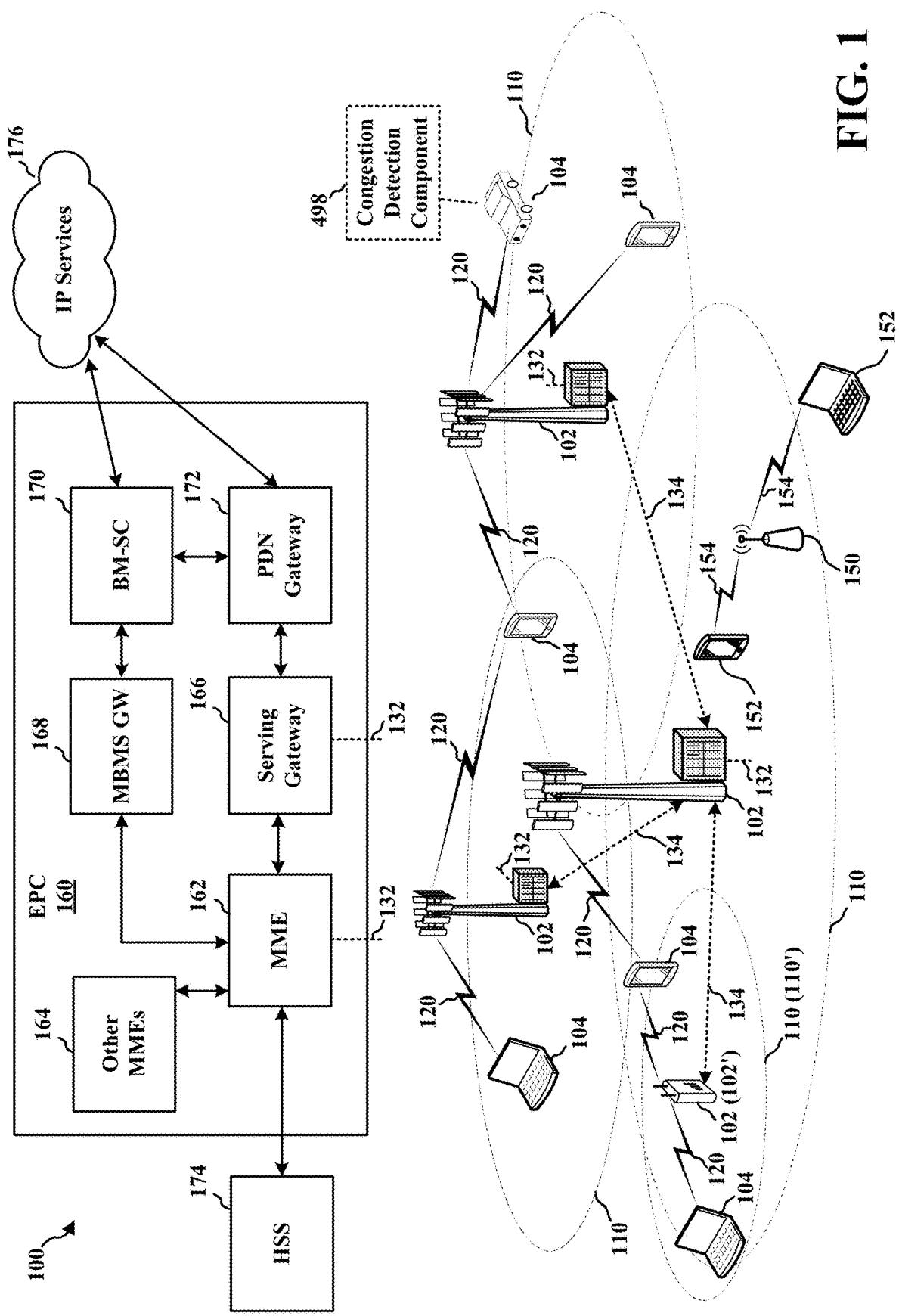
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present disclosure provides for enhancements or improvements to an apparatus and/or a procedure for mitigating network congestion. In particular, the present aspects extend the priority indication of D2D/Sidelink or ProSe communication for vehicle-to-device (V2X) communication to include a first priority parameter that indicates an expiration of a data packet or a frame and a second priority parameter that indicates a transmission classification (e.g., whether or not an expired packet is transmitted). Including the first priority parameter assists the lower layers of the UE to determine whether the packet or frame has expired and the second priority parameter provides an indication of how to handle the data packet or frame once the data packet has expired.

For example, the first parameter may include an expiration limit in milliseconds (e.g., 20 ms, 100 ms, etc.) that gauges the length of time that the packet is useful and worth transmitting, while the second parameter may include a "drop" or "deliver" flag indicating that the data packet may be dropped or delivered once the data packet has expired. For example, a periodic data packet, if not timely transmitted (e.g., 100 ms) may be obsolete since a new data packet is automatically generated with current information. As such, indicators (e.g., first priority parameter and second priority parameter) may trigger the UE to drop expired and/or obsolete packets before transmission may assist in mitigating network congestion.

Further, instead of a "drop" or "deliver" flag, the second priority parameter (e.g., treatment of expired packet) may be a leveled scheme set to drop an expired packet based on specified levels of congestion on the network. For example, the second priority parameter may be set to drop the corresponding data packet when network congestion is detected as severe (e.g., a congestion level >75%) or the congestion level is detected as moderate (e.g., a congestion level >50%) or the congestion level is detected as mild (e.g., a congestion level >25%).

To detect network congestion the apparatus and/or procedure for mitigating network congestion may perform lower layer (e.g., MAC, PHY, or V2X protocol layer) sensing at the UE such as sensing power draw on each channel to detect utilized resources on the lower layer (e.g., MAC, PHY, or V2X protocol layer). In some aspects, the congestion level may also be determined from the channel load/utilization ratio based on the received scheduling assignments (SA) sent by other vehicle/UEs on a particular channel. The UE may process the packets and/or frames for transmission based on the first congestion level and/or the second congestion level. For example, the UE may aggregate the first congestion level and the second congestion level into a packet and/or frame such as a scheduling assignment that is transmitted to a third UE, an eNodeB (eNB), and a RSU.

Additionally, the UE may adjust one or more application layer parameters based on the first congestion level and/or the second congestion level. For example, the UE may adjust the data packet generation rate or adjust the size of the packet or frame to alleviate network congestion.

Further, the UE may adjust radio resources based on the congestion level or based on the destination of the data packet or frame and/or the source of the data packet or frame. For example, an emergency vehicle with a coupled UE may use a designated emergency channel or carrier frequency during an emergency. A non-emergency vehicle may use the designated emergency channel or carrier frequency during high congestion and non-emergency situations. However, once an emergency vehicle indicates an emergency (e.g., turning on the light bar) the non-emergency vehicle may back-off from the designated emergency channel or carrier frequency.

FIG. 1 is a diagram illustrating an example of a wireless communications system and an access network 100. The wireless communications system 100 (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The eNB 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE/vehicle may include a congestion detection component 498 that is discussed below with respect to FIGS. 4-9.

Figure 2:
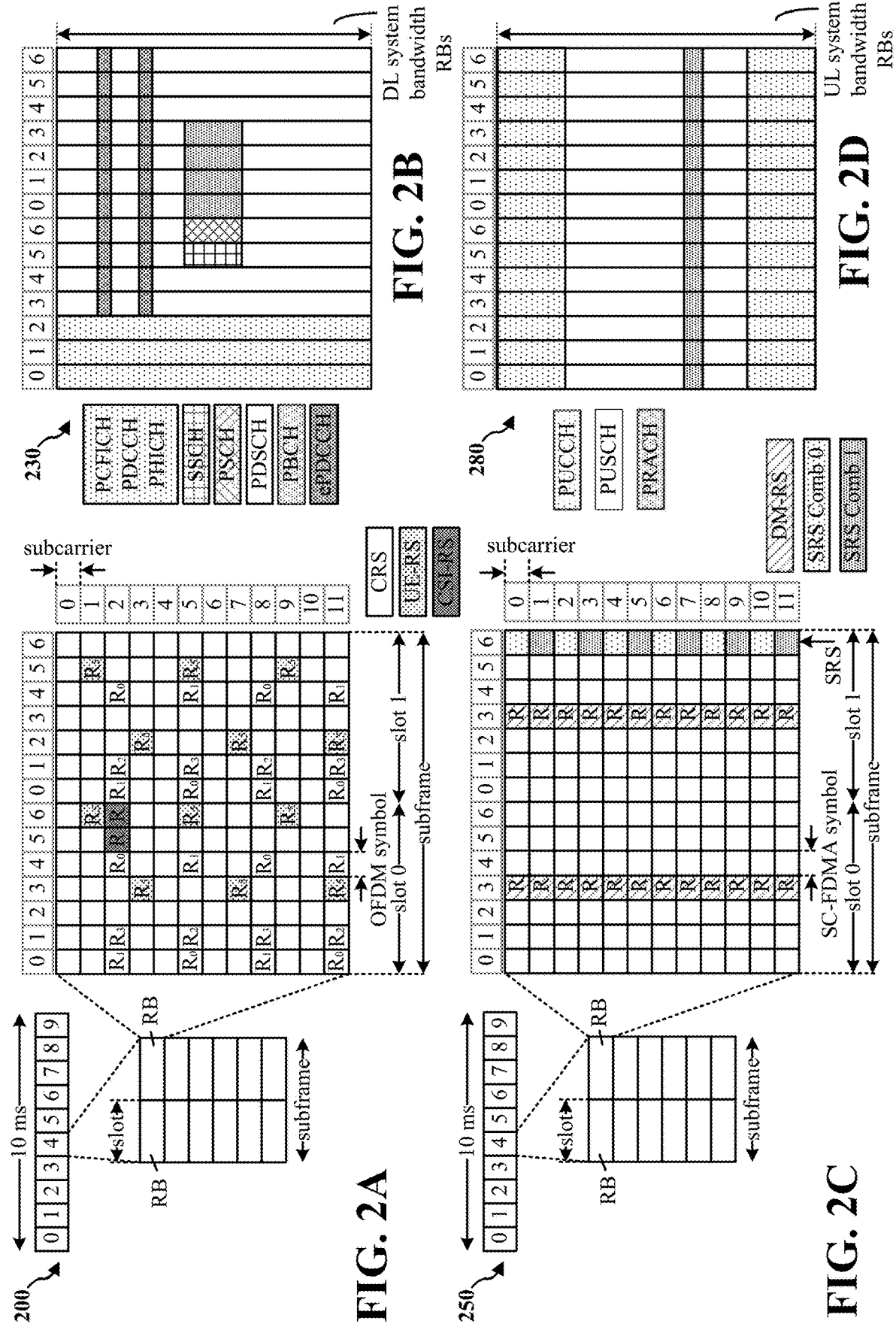
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme. As illustrated in FIG. 2A, some of the REs carry DL reference (pilot) signals (DL-RS) for channel estimation at the UE. The DL-RS may include cell-specific reference signals (CRS) (also sometimes called common $R_5$), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
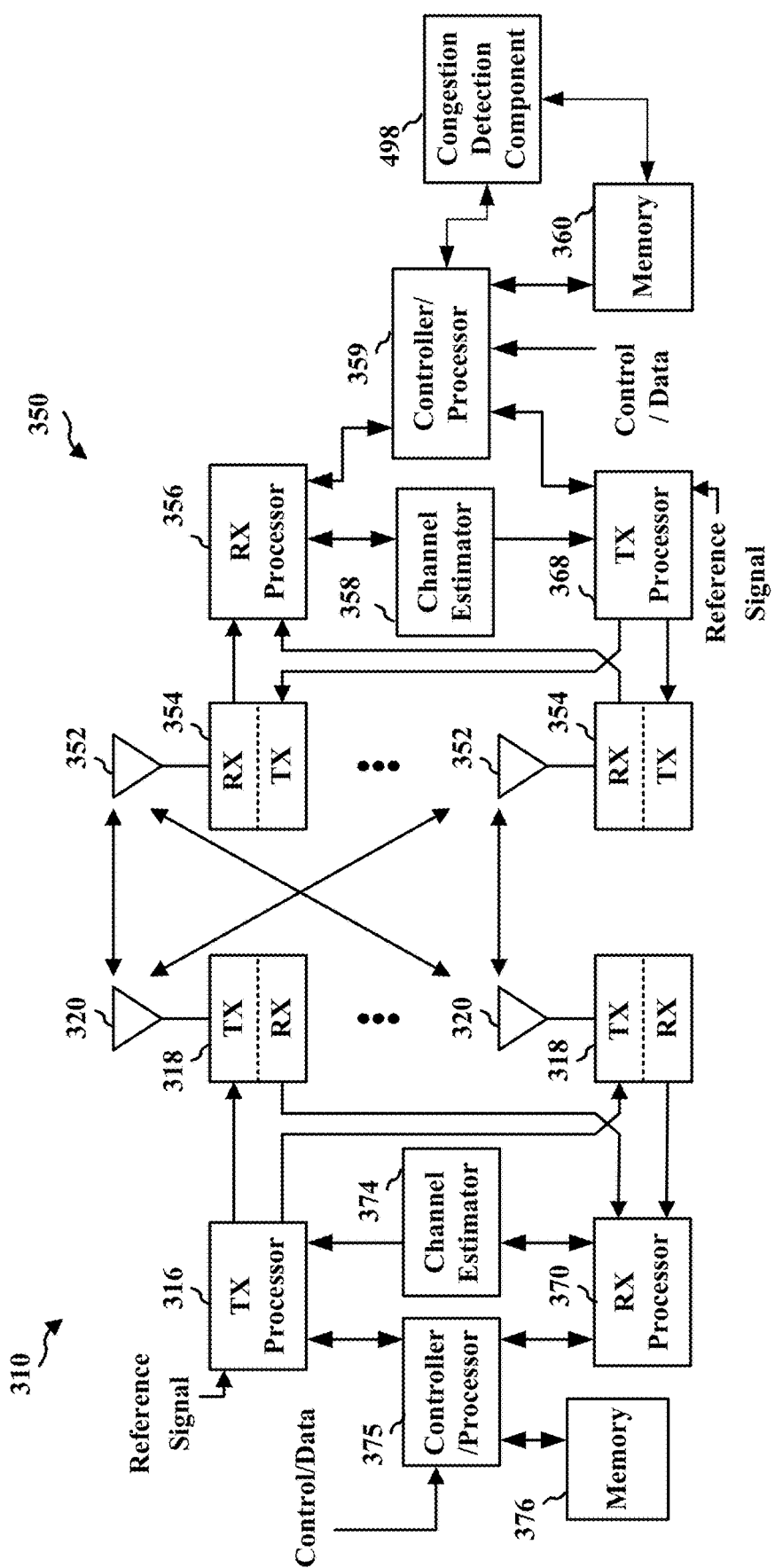
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
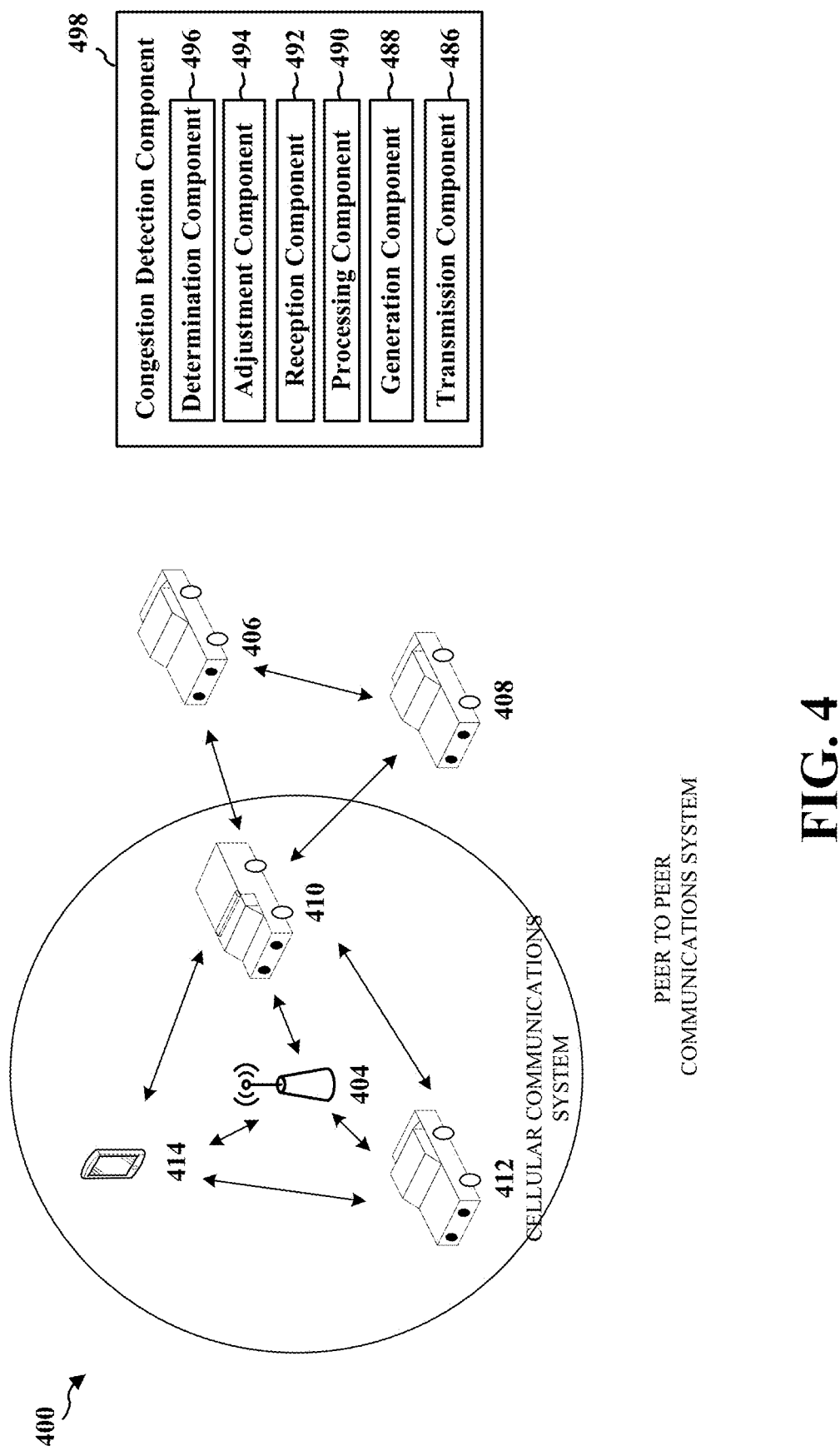
FIG. 4 is a diagram of a vehicle-to-device (V2X) communications system.

FIG. 4 is a diagram of a V2X communication system 400. The V2X communication system 400 includes a plurality of vehicles/UEs (e.g., vehicles 406, 408, 410, 412, and a UE 414) that are capable of performing V2X communication with one another. The V2X communication system 400 may overlap with a cellular communications system, such as for example, a WWAN. Some of the vehicles 406, 408, 410, 412 may perform vehicle-to-vehicle (V2V) communication with each other (e.g., using the DL/UL WWAN spectrum), some may perform V2X communication such as communication between a vehicle and the base station 404 (e.g., a road side unit (RSU)) or communication between a vehicle and a UE (e.g., UE 414), and some may do both. Some vehicles/UEs may be served by the same base station. For example, as shown in FIG. 4, the vehicle 412 and 410 are in V2V communication, the vehicle 406 and 408 are in V2V communication, and the vehicle 410 is in V2X communication with the UE 414. The vehicles 410 and 412 may also be in V2X communication with the base station 404 (e.g., eNB, RSU). The V2X communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH). The vehicles 410 and 412 and the UE 414 are served by the base station 404.

In some aspects, the RSU may be a standalone device and may connect to the base station 404 (eNB) via, for example, normal LTE in unlicensed spectrum (e.g., LTE-U interface). Further, in some aspects, the RSU may be collocated with base station 404.

The exemplary methods and apparatuses discussed infra are applicable to any of a variety of wireless V2X communications systems, such as for example, a wireless vehicle-to-device communication system based on FlashLinQ, WiMedia, Bluetooth, ZigBee, or Wi-Fi based on the IEEE 802.11 standard. To simplify the discussion, the exemplary methods and apparatuses are discussed within the context of LTE. However, one of ordinary skill in the art would understand that the exemplary methods and apparatuses are applicable more generally to a variety of other wireless device-to-device communication systems.

The V2X communication system 400 may utilize proximity-based services (ProSe) in which the vehicles 406, 408, 410, 412, and the UE 414 transmit packets using resources assigned by base station 404. The packets may include vehicle related data, such as pass history, acceleration, speed, GPS coordinates, direction of the vehicle, brake light indicators, light bar indicators, state of the vehicle, and the like. The exchange of packet information between vehicle/UEs (vehicles 406, 408, 410, 412, and a UE 414) and a base station 404 (e.g., eNB, RSU) particularly assist in determining the position of a vehicle/UE in relation to other vehicle/UEs, the status of the vehicle/UE, and an estimate of where the vehicle/UE will be next. For instance, high priority vehicle/UE 410 of the V2X communication system 400 may transmit periodic updates via packets to announce a basic safety message (BSM) to vehicles/UEs (vehicles 406, 408, 410, 412, and a UE 414), to keep the drivers/users informed of a road status.

As the vehicle/UE density within a cell increases, the limited radio resources for V2X may become congested and unable to accommodate transmission of data packets via V2X communication simultaneously. Such congestion may degrade the quality of service (QoS) particularly with respect to high priority packets such as safety related packets and/or emergency related packets. Therefore, approaches to address such congestion in V2X communication are desired.

One approach to alleviate congestion is for each of multiple vehicle/UEs of V2X communication system 400 to include a priority value (e.g., ProSe per-packet priority (PPPP)) associated with a packet to be transmitted. In such an instance, the application layer of a vehicle/UE may assign a priority value based on the importance of the packet (e.g., importance of the packet contents) and associate the priority value with the packet to be transmitted. For example, safety related packets and/or emergency related packets transmitted by a high priority vehicle/UE 410 (e.g., ambulance, police vehicle, fire truck) may be assigned the highest priority (e.g., lower PPPP values), whereas packets from vehicle/UEs 406, 408, 412, 414 associated with "nominal" vehicle operations may be assigned lower priority (e.g., higher PPPP values). The packets with the higher priority may be transmitted before transmitting the packets with the lower priority.

Enhancements to the priority indication (e.g., using the PPPP) may further assist to alleviate congestion. In particular, to address potential congestion, the priority indication from the application layer of the vehicle/UE may include additional information to help a lower layer (e.g. ProSe protocol layer/V2X protocol layer, a MAC layer, a physical layer) handle the packets. In some aspects, the PPPP may be enhanced with an expiration limit that indicates an amount of time during which a packet is useful and worth transmission. The expiration limit may be included in the PPPP or may be transmitted separately. The vehicle may determine whether a time corresponding to the expiration limit has elapsed since generation of packets. Packets generated that are not transmitted before the corresponding expiration limit lapses may be dropped or replaced with fresh packets. For example, for a periodic packet update where a packet is generated periodically, a packet that is not transmitted from the vehicle/UE within a time period corresponding to the periodic packet generation rate (e.g., 100 ms) may be considered outdated (e.g., expired) and thus may be either dropped or replaced with a "fresh" packet (e.g., a newly generated packet) for transmission because the fresh packet will be generated periodically according to the periodic packet generation rate (e.g., at a rate of every 100 ms). In such an example, the expiration limit may be set to the time period corresponding to the periodic packet generation rate. Thus, for example, if the periodic packet generation indicates generation of a packet every 100 ms, the expiration limit may be set to 100 ms. In an aspect, the expiration limit may also provide some indication of priority. In such an aspect, a higher priority packet may be relevant for a longer amount of time, and thus may have a longer expiration limit than a lower priority packet. For example, the expiration limit may be set to 20 ms for packets that are relevant for a short amount of time, 100 ms for packets that are relevant for an "average" amount of time, and may be set to infinite for packets that may be transmitted regardless of a delay in transmission.

In some aspects, the PPPP may be enhanced with an expiration treatment indicator that indicates how the lower layer (e.g., MAC, PHY, or V2X protocol layer) of a vehicle/UE may treat an expired packet (e.g., a packet whose expiration limit has elapsed). The expiration treatment indicator may be included in the PPPP or may be transmitted separately. The PPPP may be enhanced with the expiration treatment indicator and/or the expiration limit. The vehicle/UE may determine whether to drop or transmit the packet based on the priority of the packet and/or the "freshness level" of the packet, where the freshness level of the packet may be based on the expiration limit. For example, a packet may be considered fresh if the expiration limit for the packet has not elapsed. In an aspect, a vehicle/UE may determine whether to transmit an expired packet based on the expiration treatment indicator, where the expiration treatment indicator may indicate whether to deliver or drop the expired packet. For some lower priority packets (e.g., packets with average priority), the expiration treatment indicator may flag the lower layer (e.g., MAC, PHY, or V2X protocol layer) of a vehicle/UE to drop the packet with lower priority once the packet has expired (e.g., according to the expiration limit). For some high priority packets, the expiration treatment indicator may flag the lower layer (e.g., MAC, PHY, or V2X protocol layer) of a vehicle/UE to deliver the packet with high priority even if the packet has expired (e.g., according to the expiration limit). In an aspect, the expiration limit may indicate whether the packet has expired or not, as discussed above.

In some aspects, the expiration treatment indicator may indicate how to adjust the priority of a data packet once the data packet has expired. For example, a very high priority packet may be relevant for an amount of time that corresponds to a particular action (e.g., emergency situation). In this instance, the expiration of the very high priority packet corresponds to the expected amount of time of the particular action and once the very high priority packet expires (e.g., emergency situation ends), the priority of the packet may be downgraded to lower priority according to the expiration treatment indicator. As such, an expired packet may be delivered with a different priority from the original assigned priority.

In some aspects, the expiration treatment indicator may include a threshold value that indicates that a corresponding packet be will delivered unless network congestion level over V2X resources exceeds the threshold value. The network congestion level over V2X resources exceeding the threshold value may trigger a lower layer (e.g., MAC, PHY, or V2X protocol layer) to drop the corresponding packet to conserve V2X resources for higher priority packets.

In other aspects, the expiration treatment indicator may be in a leveled scheme based on a level of congestion. The expiration treatment indicator may have multiple levels that indicate respective thresholds for determining whether to drop an expired packet. For example, in some instances, the expiration treatment indicator may have three levels that indicate congestion thresholds for triggering the lower layer (e.g., MAC, PHY, or V2X protocol layer) to drop the corresponding packet so as to conserve V2X resources for higher priority packets based on whether the congestion level is severe (e.g., a congestion level >75%) or the congestion level is moderate (e.g., a congestion level >50%) or the congestion level is mild (e.g., a congestion level >25%). In an aspect, the vehicle/UE may assign a category value to the expired packet based on the priority of the expired packet (e.g., PPPP) and/or the freshness level of the packet, such that an expired packet with a particular category value may be dropped at a particular congestion level. A higher category value may be assigned to an expired packet with a higher priority and/or higher freshness level.

For example, in a case where an expired packet is assigned one of three category values, an expired packet with a category value 3 will be dropped when the congestion level is severe (e.g., congestion level >75%), an expired packet with a category value 2 will be dropped when the congestion level is moderate (e.g., congestion level >50%), and an expired packet with a category value 1 will be dropped when the congestion level is mild (e.g., congestion level >25%). Thus, for example, an expired packet with a higher priority and/or higher freshness level may not be dropped until the congestion level becomes high.

Some aspects may use the expiration limit and the expiration treatment indicator with the PPPP to determine the treatment behavior of packets at the lower layer (e.g., MAC, PHY, or V2X protocol layer) of a vehicle/UE and conserve V2X resources. For example, the PPPP may be used to handle the packets within the expiration limit, and the expiration treatment indicator may be used for handling the packets beyond of the expiration limit.

In order to determine congestion levels (e.g., by the determination component 496), vehicle/UEs (vehicles 406, 408, 410, 412, and a UE 414) may sense aspects/properties of a lower layer (e.g., MAC, PHY, or V2X protocol layer). According to one technique, vehicle/UEs (vehicles 406, 408, 410, 412, and a UE 414) may sense the power draw (e.g., energy consumption) on each channel to detect utilized resources of the lower layer (e.g., MAC, PHY, or V2X protocol layer). In this instance, the power draw may be a function of utilized channel resources that may span a range from a minimum power draw of no channels utilized to a maximum power draw of all channels utilized. In some instances, the sensed congestion level may be represented as a percentage that ranges from 0% (e.g., no vehicle/UE resources utilized) to 100% (e.g., all vehicle/UE resources utilized).

In some aspects, the congestion level sensed at the lower layer may be accessible to the upper layer. This may be beneficial in order to adjust parameters (e.g., via the adjustment component 494) on the upper layer to alleviate congestion. For example, the upper layer may adjust the periodic packet generation rate (e.g., by modifying the packet generation rate from a 100 ms interval generation rate to a 400 ms interval generation rate) based on a sensed congestion level. For example, a lower periodic packet generation rate may be used for a higher congestion level.

Another technique for determining the congestion level may be determining the channel load/utilization ratio (e.g., via the determination component 496) based on the received scheduling assignments from other vehicles/UEs on a particular channel or a resources pool. In contrast to sensing the power draw of each individual channel, the technique using the channel load/utilization ratio may use resources on the upper layer, which frees up resources on the lower layer (e.g., MAC, PHY, or V2X protocol layer).

In some aspects, vehicles/UEs may transmit (e.g., via transmission component 486) the estimated level of congestion to the base station 404 (e.g., eNB, RSU), which in turn may broadcast the estimated level of congestion out to other vehicles/UEs under coverage of the base stations 404 (e.g., eNB, RSU) using any suitable packet or signaling indication. For example, vehicle/UE 412 may transmit (e.g., transmission component 486) the estimated level of congestion to base station 404 (e.g., eNB, RSU), which in turn may transmit the estimated level of congestion of vehicle/UE 412 to high priority vehicle/UE 410 under the coverage of the base stations 404 (e.g., eNB, RSU).

In some aspects, vehicles/UEs may transmit (e.g., via transmission component 486) the estimated level of congestion directly to other vehicles/UEs within proximity using any suitable packet or signaling indication (e.g., V2V, V2X). For example, a vehicle/UE (e.g., vehicle 412) may transmit (e.g., via the transmission component 486) the estimated level of congestion directly to a high priority vehicle/UE (e.g., high priority vehicle 410). One benefit of this approach is that transmission of the estimated level of congestion directly to other vehicles/UEs is not limited by the coverage of the base stations 404 (e.g., eNB, RSU). For example, according to this approach, vehicle/UE 406 may transmit (e.g., via the transmission component 486) the estimated level of congestion directly to vehicle/UE 408 that is not within the coverage area of the base station 404.

The vehicle/UEs may include the detected congestion level as a part of the transmitted scheduling assignment. That is, each vehicle/UE may provide the congestion level to other vehicles/UEs (e.g., in proximity) as a part of the scheduling assignment infrastructure. A vehicle/UE that receives the scheduling assignment (e.g., via reception component 492) may use the scheduling assignment to confirm the congestion level detected at the lower layer of the vehicle/UE. In some instances, if a vehicle/UE does not have a reliable lower layer sensing or does not have any lower layer sensing capability or has the lower layer sensing disabled, the vehicle/UE may receive the scheduling assignment (e.g., via the reception component 492) and use the congestion level provided in the scheduling assignment.

In some aspects, the exchange of a detected congestion level between vehicles/UEs may be combined with a zoning technique, where certain vehicles/UEs within a geographical area (e.g., a small geographical area with a diameter less than 100 m) may be considered as part of a zone. In this technique, transmission behavior of each vehicle/UE may be decided based on the zone where the vehicle/UE is located. The vehicles/UEs may exchange (e.g., via V2V communication or V2X communication) the congestion level of a particular zone in the scheduling assignments along with zone information such that other vehicle/UEs may use the zone information to gauge regions of congestion. For example, the vehicles/UEs may determine based on the zone information whether the congestion level received via the exchange is the congestion level of the zone where the vehicles/UEs are located. By indicating the zone that corresponds to the congestion level, vehicles/UEs may determine which zone the congestion level is associated with. For example, if the high priority vehicle/UE 410 and the vehicle/UE 412 are located in a zone with a high level of congestion and the congestion level with the zone information are transmitted from the high priority vehicle/UE 410 to vehicle/UEs 406 and 408 (e.g., with a scheduling assignment), the vehicle/UEs 406 and 408 may adjust a congestion parameter (e.g., via the adjustment component 494) accordingly in anticipation of congestion based on the congestion level received from the high priority vehicle/UE 410.

The zoning technique may also transmit the congestion level of the zone in the scheduling assignment along with the zone information, to the base station 404 (e.g., eNB, RSU). For example, the high priority vehicle/UE 410 and vehicle/UE 412 may be located in a zone with a high level of congestion that may be transmitted (e.g., transmission component 486) from either high priority the vehicle/UE 410 or the vehicle/UE 412 to the base station 404 and may be relayed from the base station 404 to the vehicle/UE 414 (e.g., reception component 492) to configure vehicle/UE 414. In turn, vehicle/UE 414 may adjust a congestion parameter (e.g., adjustment component 494) in anticipation of the zone with a high level of congestion as the vehicle/UE 414 approaches the zone with the high level of congestion.

In some aspects, when the base station 404 (e.g., eNB, RSU) or a vehicle/UE receives congestion levels from other vehicles/UEs, the base station 404 or the vehicle/UE may aggregate (e.g., via the processing component 490) the received congestion levels within the same zone and broadcast the aggregated congestion level information and zone information as a part of a schedule assignment to assist vehicles/UEs in determining the applicability of the information on the aggregated congestion level information based on the zone information. In an aspect, congestion levels received from various vehicles/UE and/or a base station may be included in the aggregated congestion level information, or may be used to generate an aggregated congestion level that may be an averaged of the received congestion levels. When a vehicle/UE receives the aggregated congestion level information, the vehicle/UE may relay the aggregated congestion level information to another vehicle/UE. For example, the high priority vehicle/UE 410 and the vehicle/UE 412 may be within a zone with a high level of congestion. The high priority vehicle/UE 410 may aggregate (e.g., processing component 490) the congestion level from the high priority vehicle/UE 410 and the congestion level from the vehicle/UE 412 into a schedule assignment or a basic safety message to be transmitted (e.g., via the transmission component 486), thus including the congestion level information in the scheduling assignment or the basic safety message. In response, the base station 404 (e.g., eNB, RSU) may receive the aggregated congestion level information and the zone information as a part of schedule assignment that is relayed to vehicle/UE 414 (e.g., via reception component 492). In turn, the vehicle/UE 414 may reconfigure accordingly (e.g., via the adjustment component) based on the aggregated congestion level information. In some instances, the base station 404 may receive the zone information from another base station (not shown in FIG. 4) and use the zone information to derive the aggregated congestion level information.

In an aspect, a vehicle/UE (e.g., vehicle/UE 414) may not act on a received schedule assignment based on one or more status of the vehicle/UE. For example, if the vehicle/UE 414 is traveling away from a zone with a high congestion level, the information on the high congestion level in the zone (included in the scheduling assignment) may not applicable to the vehicle/UE 414 because the vehicle/UE 414 may go out of the zone shortly.

As mentioned above, once the congestion level is determined (e.g., via the determination component 496), vehicle/UEs (vehicles 406, 408, 410, 412, and a UE 414) can act on the information on the congestion level locally at the lower layer (e.g., MAC, PHY, or V2X protocol layer) to determine how to handle the packets that arrive from the upper layers. In some instances, based on the information on the congestion level, the vehicle/UE may assist to alleviate congestion and to adjust one or more parameters (e.g., via the adjustment component 494), where the adjusting the one or more parameters may include adjusting a parameter related to dropping data packets, a parameter related to triggering a "back off", and/or a parameter related to selecting radio resources.

In some aspects, the lower layer (e.g., MAC, PHY, or V2X protocol layer) may provide the determined congestion level to the application layer (e.g. via the V2X application), which may trigger the application in the application layer to take corresponding action such as adjusting (e.g., via the adjustment component 494) the packet generation rate or adjusting (e.g., via the adjustment component 494) the amount of information placed into each of the packets, based on the information on the congestion level. For example, if the congestion level is high, the packet generation rate may be reduced and/or the amount of information placed into each packet may be reduced.

In another aspect, the base station 404 (e.g., eNB, RSU) may adjust the resources allocation strategy based on the detected congestion level, where the congestion level may be received from one or more vehicle/UEs. The base station 404 may send the resource configuration based on the adjusted resource allocation to vehicles/UEs (e.g., signaled directly or via SIB or another periodically-broadcasted configuration information to the vehicle/UEs). The adjusting of the resource allocation may result more resources (e.g., by freeing up resources) or changing allocation of resources associated with a particular priority.

In an aspect, the V2X communication system 400 may include a destination based priority and/or a source based priority to be handled by the lower layer (e.g., MAC, PHY, or V2X protocol layer) and/or the application layer of the vehicle/UE. For destination based priority, the application layer of the vehicle/UE may assign a priority value (e.g., PPPP value) to a data packet based on a target (e.g., receiving vehicle/UE) of the data packet and/or use of the data packet. For example, the application layer of the vehicle/UE may determine whether the target of a message is one particular vehicle or a group of vehicles and the importance of the target, and based on such determination, the application layer assigns a priority value to the message. The lower layer (e.g., MAC, PHY, or V2X protocol layer) of the vehicle/UE may decide on the resource allocation based on the priority value, by, for example, selecting resources from associated radio resources pool(s). In some instances, a priority may be mapped to a corresponding resource pool(s), such that the application layer may allocate resources of the resource pool(s) that corresponds to a particular priority. The radio resource mapping to a priority value may be pre-configured or signaled from base station 404 (e.g., eNB, RSU).

In an aspect, in the V2X communication system 400, some application data may be associated with a particular channel/carrier frequency (e.g., in addition or as an alternative to being associated with radio resources on a single channel/carrier frequency). For example, the high priority vehicle/UE 410 may transmit safety related packets on a particular channel reserved for emergencies, whereas the high priority vehicle/UE 410 may transmit other non-emergency related services on another channel reserved for non-emergencies. In this instance, the mapping between the priority value and the channel/carrier frequency may be made available to a UE (e.g., high priority vehicle/UE 410) and/or the base station 404 (e.g., eNB, RSU).

In some aspects, one or more packets may be transmitted with a lower layer identifier (e.g., specific Layer 2 (L2) Group ID), which may help vehicle/UEs 406, 408, 410, 412, 414 determine a priority value. Thus, for example, different L2 Group IDs may be used to indicate different priority values. For example, an L2 group ID may be designated to define a priority value and thus the lower layer may have a priority value mapped to a particular L2 ID (e.g. L2 group ID).

For source based priority, some V2X applications may be configured to accommodate vehicles/UEs having a higher priority (e.g., ambulances, police cars, fire trucks). In an aspect, different vehicles/UEs may be associated with respective priorities, and thus a data packet from a particular vehicle/UE may be associated with a corresponding priority of the vehicle/UE. Examples may include emergency situations where the high priority vehicle/UE 410 may transmit and receive packets on a reserved carrier frequency or a designated channel with little to no congestion to ensure that messages carried by the packets are exchanged before non-emergency packets.

One approach to handle source based priority packets is to allocate special resources (e.g., lower layer resources) that may be adjusted to accommodate vehicles/UEs associated with a higher priority (e.g., ambulances, police cars, fire trucks). For instance, the V2X communication system 400 may include information on special resources (e.g., designated carrier frequencies or reserved channels) that may be used by both lower priority vehicle/UEs 406, 408, 412, 414 and the high priority vehicle/UE 410 during a "normal" operation (e.g., non-emergency situations) to transmit and to receive packets. However, during an emergency situation, the special resources may be used by the high priority vehicle/UE 410 but may not be used by other vehicles with a lower priority. In an aspect, the high priority vehicle/UE 410 may suspend the transmission and the reception of one or more packets that originate from a non-high priority vehicle/UE. For instance, emergency vehicle/UE 410 may transmit a "back-off" indicator that directs lower-priority vehicle/UEs 406, 408, 412, 414 and base station 404 (e.g., eNB, RSU) to suspend the transmission and reception of one or more packets on the designated frequencies and/or channels except from packets that originate from one or more high priority vehicle/UEs 410 (e.g., ambulances, police cars, fire trucks). This means that the base station 404 (e.g., eNB, RSU), and lower-priority vehicle/UEs 406, 408, 412, 414 are configured to receive and to retransmit packets that originated from emergency vehicle/UEs 410 during an emergency using the special resources (e.g., designated emergency frequencies and/or channels). This technique facilitates a dynamic way of allocating resources that alleviates congestion for packets from emergency vehicle/UEs (e.g., ambulances, police cars, fire trucks) during an emergency as well as a way to alleviate congestion during "normal" operation (e.g., non-emergency situations).

In an aspect, the "back-off" indicator may be included as part of the scheduling assignment and sufficient resources may be reserved for sending the scheduling assignment for such high priority messages. Thus, in such an aspect, all vehicles/UEs including lower-priority vehicles/UEs and high priority vehicles/UEs may utilize the special resources in normal operation. When a scheduling assignment is detected on the special resources with a back-off indicator (e.g., an ambulance transmission), the lower-priority UEs may vacate the channel/resources pool(s) unless the lower-priority vehicles are also performing a high priority transmission. Thus, high priority transmissions from high priority vehicles/UEs as well as lower-priority vehicles/UEs may utilize the special resources.

Another approach to handle source based priority packets is for the base station 404 (e.g., eNB, RSU) to reconfigure the resource allocation based on a detected congestion level from one or more vehicle/UEs 406, 408, 410, 412, 414 on a particular frequency and/or channel (e.g., special resources). In particular, when a lower-priority vehicle/UE detects a high congestion level on the special resources, the lower-priority vehicle/UE may report the high congestion level to the base station. The base station may then reconfigure the resource allocation such that high-priority vehicles/UEs may utilize the special resources (e.g., for communicating data packets with high priority) while the lower-priority vehicles/UEs may not utilize the special resources. This approach assists to alleviate congestion during "normal" operation (e.g., non-emergency situations) while ensuring that high priority vehicle/UEs may be allocated on the particular frequency and/or channel during an emergency. This approach may be further enhanced by having one or more vehicle/UEs 406, 408, 410, 412, 414, that are about to leave coverage of the cell of base station 404 and enter a new area of cell coverage in the direction emergency vehicle/UE 410 is traveling, relay instructions from the base station 404 (e.g., eNB, RSU) to the base station in the adjacent cell to vacate a frequency and/or channel in anticipation of high priority vehicle/UE 410.

In some instances, high priority vehicle/UE 410 can send a request the base station 404 (e.g., eNB, RSU) via RRC signaling or MAC, to prepare for a high priority transmission. In response, the base station 404 (e.g., eNB, RSU) may prepare several cells ahead of a high priority transmission to adjust the channel/resources configuration to provide dedicated access to the resources/channel for the high priority transmission.

In an aspect, the scheduling assignment may be enhanced to carry additional information. The additional information may include a detected congestion level (e.g. no congestion, low congestion, mid congestion, high congestion), a requested back-off (e.g., reserved pool to be used) to indicate that lower-priority vehicles/UEs should vacate the special resources (e.g., highest priority channel/resources pool), and packet freshness (e.g., indicating whether the data packet is still fresh). A vehicle/UE that receives the packet freshness may determine whether to process/receive the data packet based on the packet freshness. For example, the "time of generation" of the data packet may be sent to the receiving vehicle/UE, so that each receiving vehicle/UE can decide whether the data packet is fresh or not. Considering the constraints of the scheduling assignment bits, a smaller value may be used for the packet freshness. For example, the packet freshness may be indicated by a binary value, or by an age indicator to indicate the "age" of the data packet (e.g. freshly generated, somewhat aged, or about to expire)).

In an aspect, the RRC dedicated signaling to the network/base station (e.g., eNB/RSU) may carry the additional information, for example, in the particular message such as SideLinkUEInformation message from a vehicle/UE to the network/base station. The additional information carried by the RRC dedicated signaling may include a detected congestion level, a requested back-off, a location and/or travel direction of a vehicle/UE, etc.

In an aspect, an access stratum (AS) signaling message (e.g., RRC Connection Reconfiguration response message or MAC) from the eNB to the UE can carry additional information such as an overall congestion level, a back-off parameter (e.g., a number of scheduling assignment intervals, or a number of subframes, or some absolute time value, and a particular group (e.g., as indicated by logical channel group (LCG) identifiers), that should back off from transmission or suspend the transmission.

Figure 5:
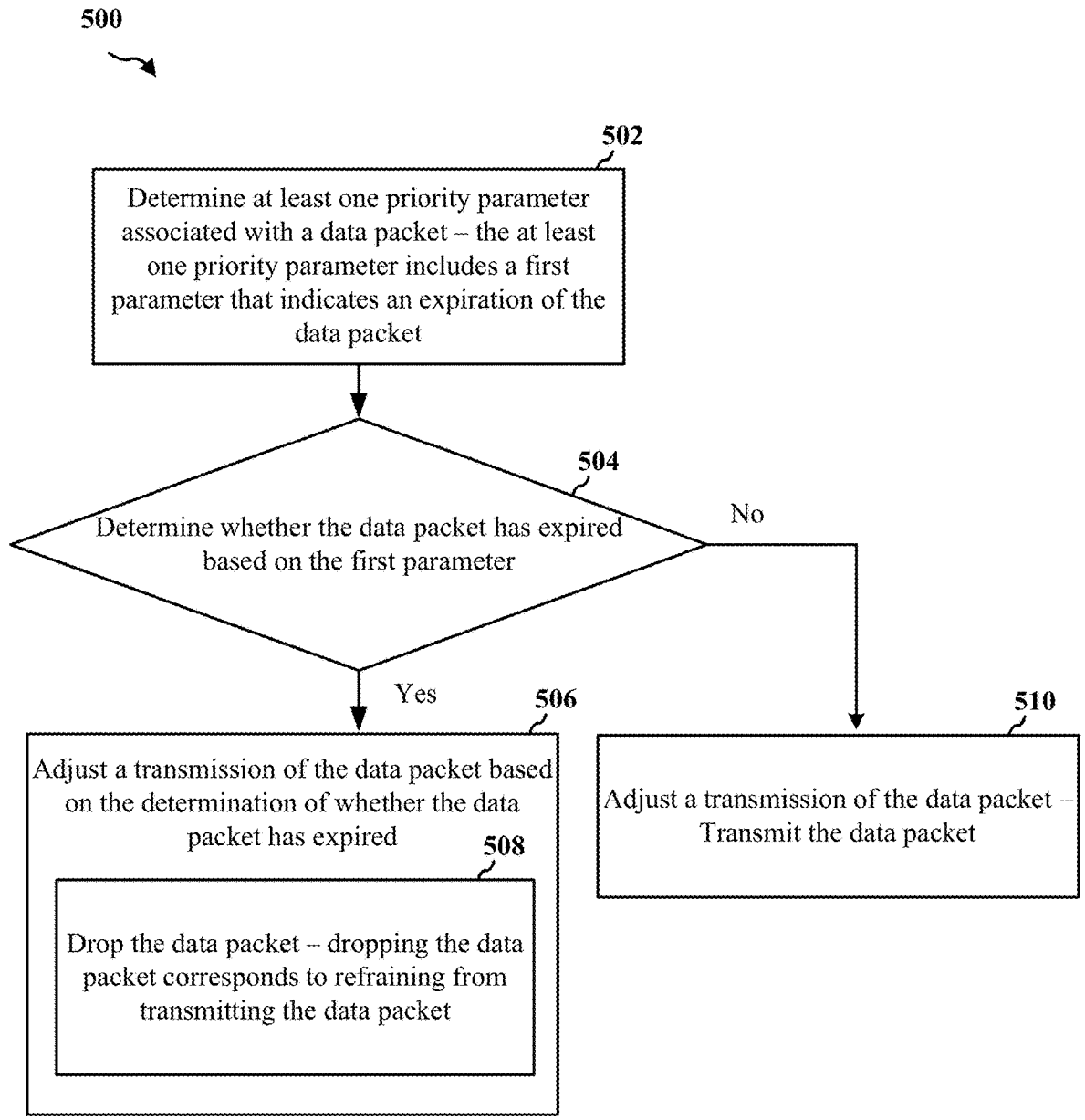
FIG. 5 is a flowchart for determining whether to drop an expired data packet prior to transmission to alleviate network congestion.

FIG. 5 is a flowchart 500 for determining whether to drop an expired data packet prior to transmission to alleviate network congestion. The method may be performed by a UE (e.g., the vehicle/UEs 406, 408, 410, 412, 414, the apparatus 802/802'). In an aspect, the UE may be coupled to a vehicle as part of a proximity-based service.

In an aspect, at block 502, the UE determines at least one priority parameter associated with a data packet. The at least one priority parameter includes a first parameter that indicates an expiration of the data packet. In an aspect, for example, the apparatus may determine that the at least one priority parameter includes an expiration limit of 20 ms. The expiration limit may be the first parameter. For example, as discussed above, the PPPP may be enhanced with an expiration limit that indicates an amount of time during which a packet is useful and worth attempting to transmit. As discussed above, the first parameter may be an expiration limit that may indicate the amount of time during which a packet is useful and worth attempting to transmit. In some aspects, the first parameter may include a date stamp that indicates the age of the data packet. For example a date stamp may indicate when the data packet was created and thus may be compared with the current time to determine the age of the data packet. For example, the date stamp may include the time of expiration of the data packet.

In an aspect, at block 504, the UE determines whether the data packet has expired based on the first parameter. For example, the UE may determine the elapsed time since generating the packet and may compare the elapsed time to the expiration limit of 20 ms. If the time elapsed is greater than 20 ms, the UE may determine that the data packet has expired. If the time elapsed is less than 20 ms, the UE may determine that the data packet has not expired.

In an aspect, at block 506, the UE adjusts a transmission of the data packet based on the determination of that the data packet has expired. For example, the UE may adjust the transmission of the data packet by queuing the data packet for removal. In some aspects, the UE adjusts the transmission of the data packet based on a second parameter that indicates a transmission classification. For example, the second parameter may be an expiration treatment indicator. For example, the UE may adjust the transmission of the data packet based on the expiration treatment indicator set to "drop." That is, if the UE determines that the data packet has expired (e.g., based on the expiration limit) and the expiration treatment indicator is set to "drop," the UE adjusts the transmission to drop the data packet. If the UE determines that the data packet has expired (e.g., based on the expiration limit) and expiration treatment indicator is set to "deliver," the UE adjusts the transmission to transmit the data packet.

In an aspect, at block 508, the UE may drop the data packet, upon determination that the data packet has expired. In this instance, the configuration to drop the data packet corresponds to a configuration to refrain from transmitting the data packet.

For example, the UE may be configured to delete the data packet or remove the data packet from a transmission queue.

In an aspect, at block 510, the UE may transmit the data packet upon determination that the data packet is not expired and based on the second parameter. In one example, the expiration limit may be set to 100 ms and the expiration treatment indicator may be set to "drop." In this instance, the UE may transmit the data packet if elapsed time is less than 100 ms (e.g., the data packet has not expired) and the UE may drop the data packet if time elapsed is greater than 100 ms (e.g., the data packet has expired). In another example, the expiration limit may be set to 100 ms and the expiration treatment indicator may be set to "deliver." In this instance, the UE may transmit the data packet if elapsed time is less than 100 ms (e.g., the data packet has not expired) and the UE may transmit the data packet if time elapsed is greater than 100 ms (e.g., the data packet has expired). This is particularly useful for data packets to be delivered regardless of delay. In some aspects, as discussed above, the second parameter includes one of a drop expired packet indication or a transmit expired packet indication.

In some aspects, the second parameter includes congestion thresholds for determining whether to drop the data packet or to transmit the data packet based on a congestion level. For example, in some instances the expiration treatment indicator may have three levels that indicate thresholds that will trigger the lower layer (e.g., MAC, PHY, or V2X protocol layer) to drop data packets based on whether the congestion level is severe (e.g., congestion level >75%) or the congestion level is moderate (e.g., congestion level >50%) or the congestion level is mild (e.g., congestion level >25%). In some aspects, the congestion thresholds include at least three levels. In some aspects, the congestion thresholds include one of a first congestion threshold, a second congestion threshold greater than the first congestion threshold, or a third congestion threshold greater than the second congestion.

Figure 6:
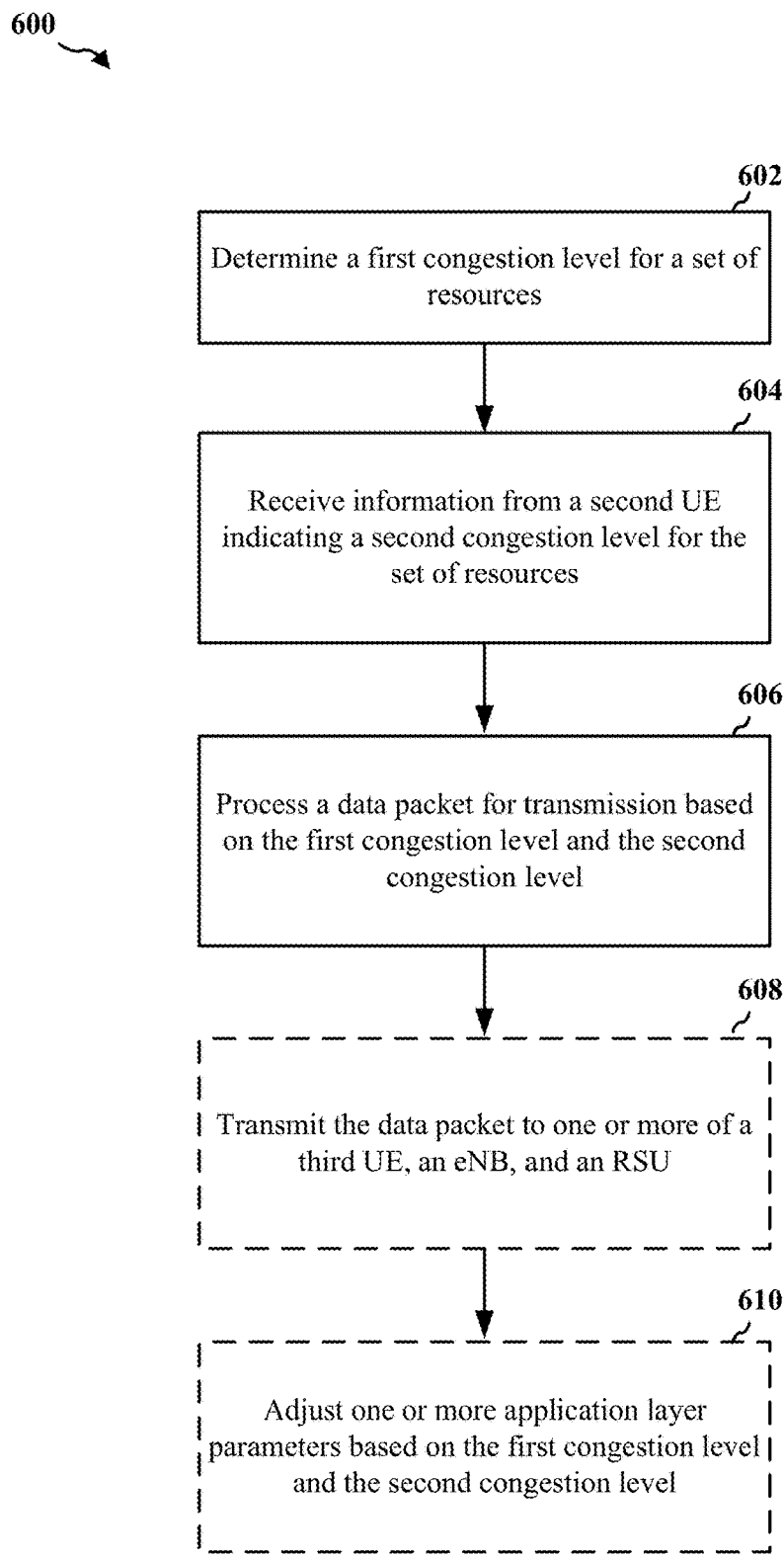
FIG. 6 is a flowchart for processing a data packet based on detected congestion levels.

FIG. 6 is a flowchart 600 for processing a data packet based on detected congestion levels. The method may be performed by a UE (e.g., the vehicle/UEs 406, 408, 410, 412, 414, the apparatus 802/802').

In an aspect, at block 602, the UE determines a first congestion level for a set of resources. In an aspect, the UE may determine the first congestion level based on physical layer sensing. For example, the UE may sense the power draw (e.g., energy) on each channel, which indicates utilized resources on the lower layer (e.g., MAC, PHY, or V2X protocol layer).

In an aspect, at block 604, the UE receives information from a second UE that indicates a second congestion level for the set of resources. For example, a second UE may determine a congestion level of 45%. The second UE may transmit a basic safety message that included the congestion level of 45%. The UE may receive basic safety message with the congestion level of 45%.

In some aspects, the second congestion level is based on a schedule assignment that include channel utilizations. For example, a second UE may transmit a scheduling assignment to the UE. In turn, the UE may determine the channel load/utilization within the scheduling assignment to determine the congestion level. In some instances, the second congestion level is determined from the channel load/utilization ratio from the received scheduling assignments from other UEs (e.g., vehicle/UEs on a particular channel or resources pool).

In an aspect, at block 606, the UE processes a data packet/frame for transmission based on the first congestion level and the second congestion level. For example, the first congestion level may be 45% that is sensed from the lower layer on the UE. The second congestion level may be 75% from a second UE that is located in the direction of travel of the vehicle. As such, the UE may change the package generation rate to 200 ms from 100 ms in anticipation of congestion to alleviate network congestion in the direction of travel.

In some aspects, in order for the UE to process the data packet/frame for transmission the UE may be configured to aggregate the first congestion level and the second congestion level into the data packet/frame. In some instances, the data packet/frame may correspond to a signaling data packet/frame that includes congestion level information. In some instances, the configuration to aggregate the first congestion level and the second congestion level into the data packet/frame may be part of a zoning technique with certain UEs within a small geographical area (e.g., less than 100 m in diameter) as part of a zone. For example, the UE may retrieve congestion levels from the basic safety messages of multiple vehicles. The UE may aggregate each congestion levels and include the aggregated congestion level information in a basic safety message. The aggregated congestion level information in the basic safety message may be relayed to other UEs that are not in the same zone as the UE.

In some aspects, in order for the UE to processes the data packet/frame for transmission the UE is further configured to determine an estimated congestion level based at least on the first congestion level and the second congestion level. In this instance the estimated congestion level is included in a data packet/frame. For example, the UE may detect a first congestion level of 45%. The UE may receive a second congestion level of 50% from a nearby UE. In turn, the UE may average the first congestion level of 45% and the second congestion level of 50% to an estimated congestion level of 47.5%. The UE may transmit a basic safety message that with the estimated congestion level of 47.5% to an eNB of nearby UEs.

In some aspects, the data packet/frame is a scheduling assignment. That is, the UE may include the first congestion level in the scheduling assignment the UE sends out, which allows other UEs in proximity to be aware of the UE's detected congestion level.

In some aspects, in order for the UE to process the data packet/frame for transmission the UE is further configured to adjust the set of resources. In some aspects, in order for the UE to process the data packet for transmission the UE may be further configured to drop the data packet/frame when the first congestion level or the second congestion level exceeds a congestion threshold. In this instance, the configuration to drop the data packet/frame corresponds to a configuration to refrain from transmitting the data packet/frame. In some instances, the data packet/frame corresponds to a user data packet/frame and distinct from a signaling data packet/frame. In some aspects, in order for the UE to process the data packet/frame for transmission, the UE is further configured to trigger a back-off request when the first congestion level or the second congestion level exceeds a congestion threshold.

In an aspect, at block 608, the UE transmits the data packet/frame to one or more of a third UE, an eNodeB, and a road side unit. For example, the UE may transmit basic safety messages that include a congestion level that is received by third UE, an eNodeB, or a road side unit.

In an aspect, at block 610, the UE adjusts one or more application layer parameters based on the first congestion level and the second congestion level. For example, the first congestion level may be 45% that is sensed from the lower layer on the UE. The second congestion level may be 75% from a second UE that is located in the direction of travel of the vehicle. As such, the UE may decrease the size of the data packages/frame in anticipation congestion to alleviate network congestion in the direction of travel. In some aspects, in order for the UE to adjust the one or more application layer parameters, the UE is further configured to adjust a data packet/frame generation rate parameter. In some aspects, in order for the UE to adjust the one or more application layer parameters, the UE is further configured to adjust a packet/frame size parameter that limits the amount of information placed into the data packet/frame.

Figure 7:
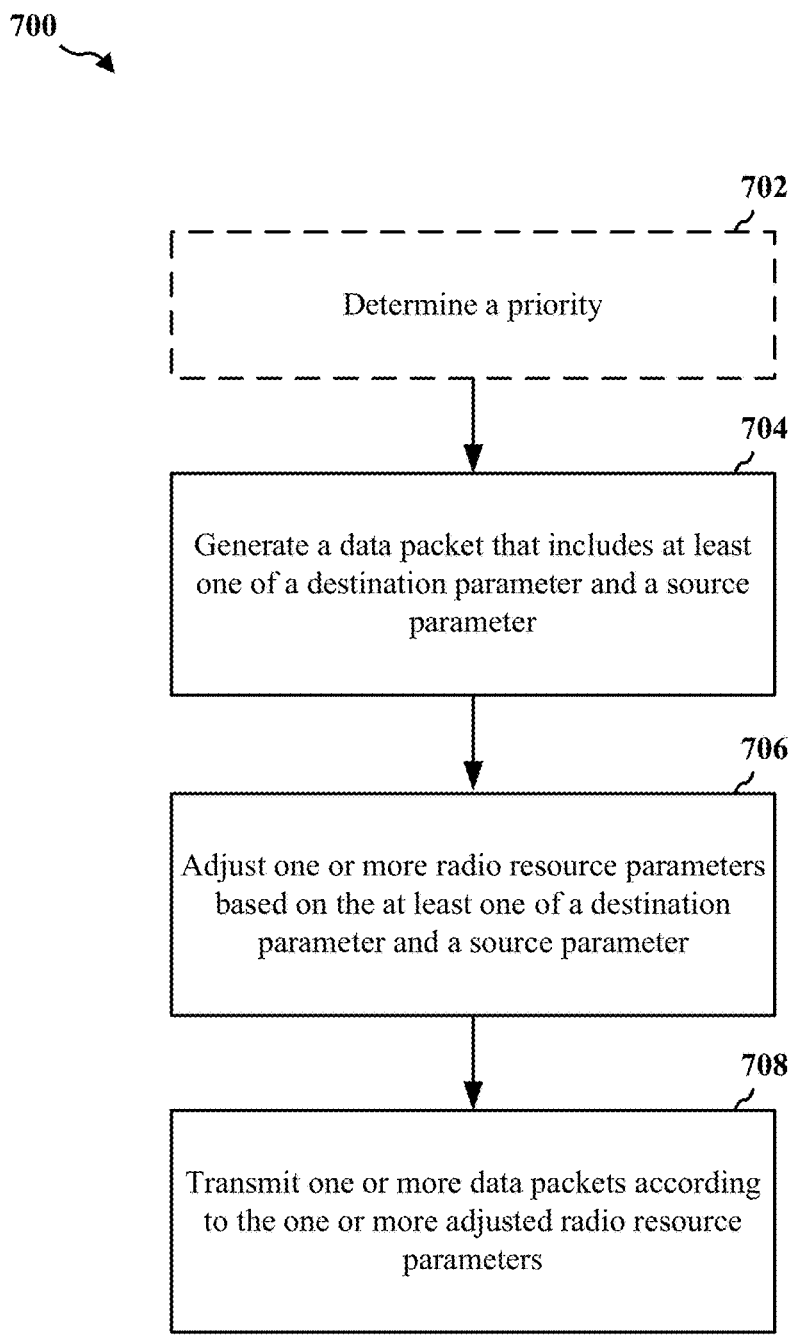
FIG. 7 is a flowchart for adjusting radio resource parameters based on the destination of a data packet or the source of a data packet.

FIG. 7 is a flowchart for adjusting radio resource parameters based on the destination of a data packet or the source of a data packet. The method may be performed by a UE (e.g., the vehicle/UEs 406, 408, 410, 412, 414, the apparatus 802/802').

In an aspect, at block 702, the UE may determine a priority for a data packet (e.g., for a destination parameter and/or a source parameter). For example, the UE may determine a priority in ProSe communication for vehicle-to-device (V2X) communication.

In an aspect, at block 704, the UE generates a data packet/frame that includes at least one of a destination parameter and a source parameter. For example, the UE may be coupled to an ambulance (e.g., emergency vehicle). The ambulance/UE may generate a data packet/frame with a parameter that indicates the data packet/frame originates from the ambulance (e.g., emergency vehicle). During an emergency the data packet/frame may be destined for other emergency vehicles (e.g., police, fire truck) and as such non-emergency UEs receiving the data packets may escalate the priority and re-transmit the ambulance data packets/frames before transmitting other data packets/frames.

In an aspect, at block 706, UE adjusts one or more radio resource parameters based on the at least one of the destination parameter and the source parameter. For example, the UE may be coupled to an ambulance (e.g., emergency vehicle) that transmits a data packet/frame. During an emergency the UE may adjust radio resource parameters to transmit and receive on a designated frequency or channel. In some aspects, the one or more radio resource parameters may include a designated channel or a designated carrier frequency. For example, a safety related message may use a special channel, whereas other services may use the remaining channel(s). In this instance, the priority value (e.g., PPPP) to channel/frequency mapping may also be made available to the UE.

In an aspect, at block 708, the UE transmits one or more data packets according to the one or more adjusted radio resource parameters. For example, the UE may be coupled to an ambulance (e.g., emergency vehicle) that transmits a data packet/frame. In some aspects, the data packet/frame that includes at least one of a destination parameter and a source parameter further includes a back-off request. For example, during an emergency, the ambulance/UE may adjust radio resource parameters to increase bandwidth and to transmit a back-off request to nearby vehicles/UEs to vacate a frequency or channel. In turn, nearby vehicles/UEs not designated as high priority (e.g., emergency vehicles) may vacate the frequency or channel.

Figure 8:
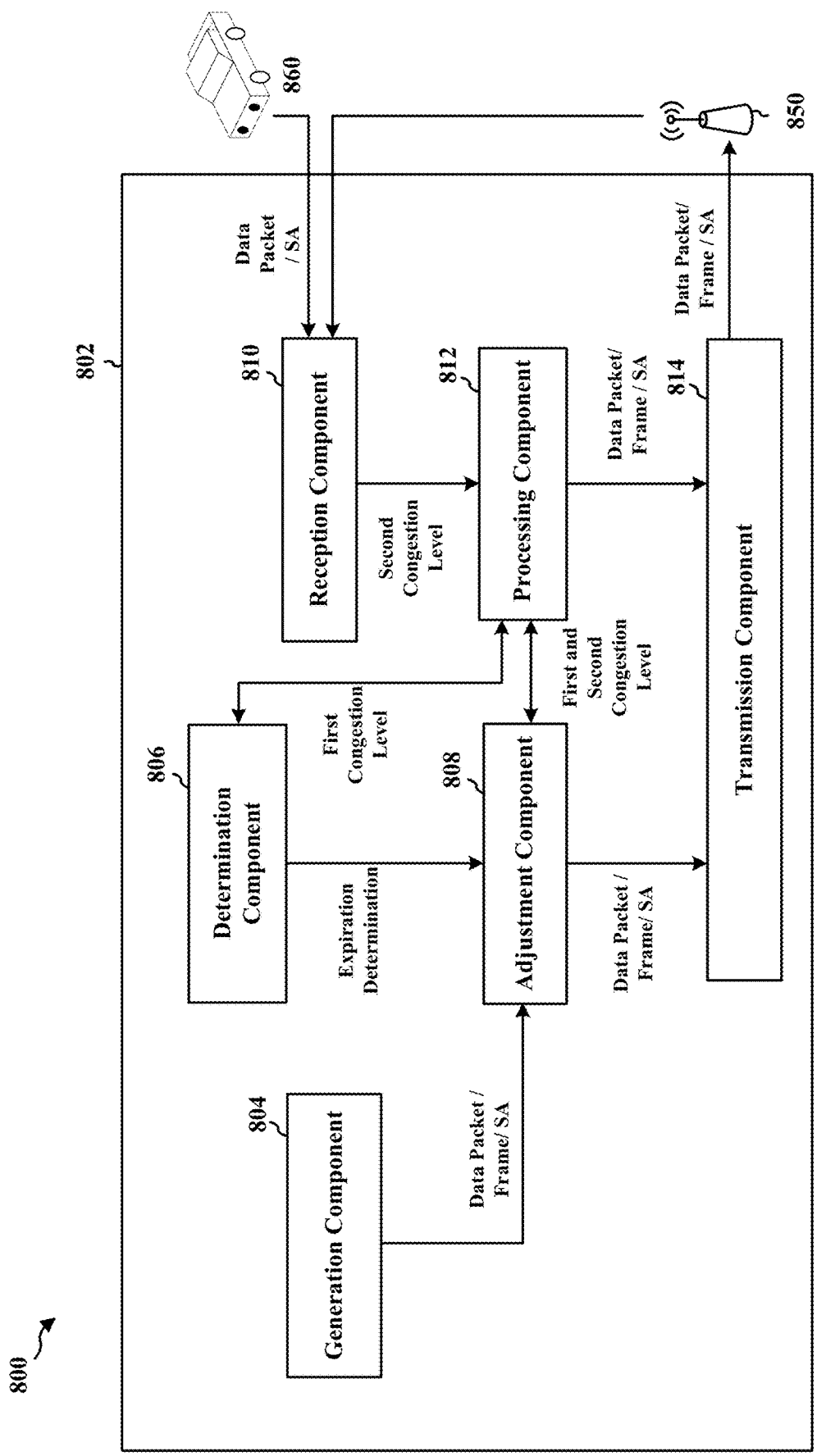
FIG. 8 is a conceptual data flow diagram illustrating the data flow between different means/components in an exemplary apparatus.

FIG. 8 is a conceptual data flow diagram 800 illustrating the data flow between different means/components in an exemplary apparatus 802. The apparatus may be a vehicle/UE. The apparatus includes a generation component 804, a determination component 806, an adjustment component 808, a reception component 810, a processing component 812, and a transmission component 814. In one aspect, the determination component 806 is configured to determine priority parameters associated with a data packet that includes a first parameter that indicates an expiration of the data packet and a second parameter that indicates a transmission classification. In addition, determination component 806 is configured to determine whether the data packet has expired based on the first parameter and provide the data packet to adjustment component 808. The adjustment component 808 is configured to adjust a transmission of the data packet based on the determination of whether the data packet has expired.

In one configuration, the adjustment component 808 is configured to drop the data packet upon determination that the data packet has expired. That is, the configuration to drop the data packet corresponds to a configuration to refrain from transmitting the data packet. In one configuration, the adjustment component 808 is configured to adjust the transmission of the data packet based on a second parameter that indicates a transmission classification. In one configuration, the adjustment component 808 is configured to provide the data packet to transmission component 814. In this configuration, transmission component 814 is configured to transmit the data packet upon determination that the data packet is not expired and based on the second parameter. In one configuration, the second parameter includes one of a drop expired packet indication or a transmit expired packet indication. In one configuration, the second parameter includes congestion thresholds for determining whether to drop the data packet or to transmit the data packet based on a congestion level. In one configuration, the congestion thresholds include at least three levels. In one configuration, the UE is coupled to a vehicle as part of a proximity-based service.

In another aspect of apparatus 802, the determination component 806 is configured to determine a first congestion level for a set of resources and provide the first congestion level to processing component 812. The reception component 810 is configured to receive information (e.g., data packets, SA) from second vehicle/UE 860 or an eNB that indicates a second congestion level for the set of resources and provide the second congestion level to processing component 812. Processing component 812 is configured to process a frame for transmission based on the first congestion level and the second congestion level.

In one configuration, the determination component 806 is configured to determine the first congestion level is based on physical layer sensing. In one configuration, the second congestion level is based on schedule assignments received at reception component 810 that include channel utilizations. In one configuration, the processing component 812 is configured to aggregate the first congestion level and the second congestion level into the frame. In one configuration, the frame corresponds to a signaling frame including congestion level information. In one configuration, the frame is a scheduling assignment. In one configuration, processing component 812 is configured to provide the data packet or scheduling assignment to transmission component 814. In such a configuration, transmission component 814 is configured to transmit the data packet to one or more of a third UE, an eNodeB, or a road side unit. In one configure, processing component 812 is further configured to determine an estimated congestion level based at least on the first congestion level and the second congestion level and place the estimated congestion level in the frame. In such a configuration, processing component 812 is configured to provide the frame to transmission component 814, whereby transmission component 814 is configured to transmit the data packet to one or more of a third UE, an eNodeB (eNB), or a road side unit (RSU). In one configuration, processing component 812 is configured to adjust the set of resources. In one configuration, processing component 812 is configured to drop the frame when the first congestion level or the second congestion level exceeds a congestion threshold. That is, the configuration to drop the frame corresponds to a configuration to refrain from transmitting the frame. In one configuration, the data frame corresponds to a user data frame and distinct from a signaling data frame. In one configuration, processing component 812 is configured to trigger a back-off request when the first congestion level or the second congestion level exceeds a congestion threshold. In one configuration, processing component 812 is further configured to provide the first congestion level and the second congestion level to adjustment component 808. In such a configuration, adjustment component 808 is configured adjust one or more application layer parameters based on the first congestion level and the second congestion level. In one configuration, adjustment component 808 is configured to adjust a data packet generation rate parameter. In one configuration, adjustment component 808 is configured to adjust a packet size parameter that limits the amount of information placed into a data packet.

In another aspect of apparatus 802, the determination component 806 is configured to determine a priority and provide the priority to adjustment component 808. The generation component 804 is configured to generate a data packet that includes at least one of a destination parameter or a source parameter and provide the data packet to adjustment component 808. The adjustment component 808 is configured to adjust one or more radio resource parameters based on the at least one of the destination parameter or the source parameter. The transmission component 814 is configured to receive the data packet from the adjustment component 808. The transmission component 814 is further configured to transmit one or more data packets according to the one or more adjusted radio resource parameters.

In one configuration, the one or more radio resource parameters include a designated channel or a designated carrier frequency. In one configuration, the data packet that includes at least one of the destination parameter and the source parameter further includes a back-off request.

The apparatus may include additional components that perform each of the blocks of the algorithm in the aforementioned flowcharts of FIGS. 5-7. As such, each block in the aforementioned flowcharts of FIGS. 5-7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
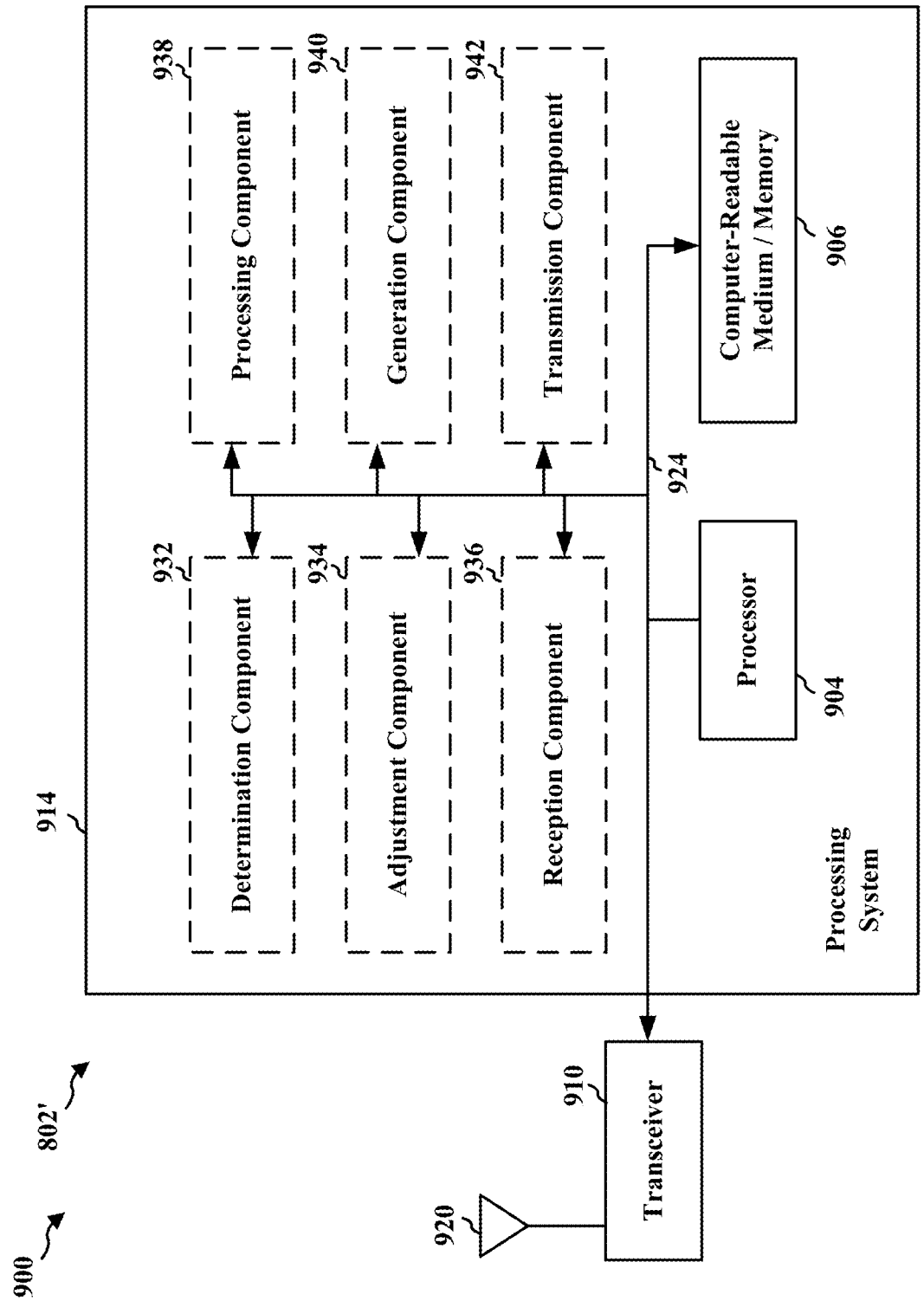
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, 810, 812, 814, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 810. In addition, the transceiver 910 receives information from the processing system 914, specifically the transmission component 814, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, 810, 812, and 814. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining at least one priority parameter associated with a data packet, where the at least one priority parameter includes a first parameter that indicates an expiration of the data packet. In addition, the apparatus includes means for determining whether the data packet has expired based on the first parameter. In addition, the apparatus includes means for adjusting a transmission of the data packet based on the determination of whether the data packet has expired. In one configuration, the apparatus may further include means for dropping the data packet upon determining that the data packet has expired. In such a configuration, the means for dropping the data packet is configured to refrain from transmitting of the data packet. In one configuration, the apparatus may further include means for transmitting the data packet upon determination that the data packet is not expired and based on the second parameter. In one configuration, the means for adjusting the transmission of the data packet is configured to adjust the transmission based on a second parameter that indicates a transmission classification. In one configuration, the second parameter includes one of a drop expired packet indication or a transmit expired packet indication. In one configuration, the second parameter includes congestion thresholds for determining whether to drop the data packet or to transmit the data packet based on a congestion level. In one configuration, the congestion thresholds include at least three levels. In one configuration, the apparatus is coupled to a vehicle as part of a proximity-based service.

In another configuration, the apparatus 802/802' for wireless communication includes means for determining a first congestion level for a set of resources. In addition, the apparatus includes means for receiving information from a second UE that indicates a second congestion level for the set of resources. In addition, the apparatus includes means for processing a frame for transmission is configured to process the frame based on the first congestion level and the second congestion level. In one configuration, the means for determining the first congestion level is configured to determine the first congestion level based on physical layer sensing. In one configuration, the second congestion level is based on schedule assignments that include channel utilizations. In one configuration, the means for processing the frame for transmission is configured to aggregate the first congestion level and the second congestion level into the frame. In one configuration, the frame corresponds to a signaling frame including congestion level information. In one configuration, the frame is a scheduling assignment. In one configuration, the apparatus may further include means for transmitting the frame to one or more of a third UE, an eNodeB (eNB), or a Road Side Unit (RSU). In one configuration, the means for processing the frame for transmission is further configured to determine an estimated congestion level based at least on the first congestion level and the second congestion level; and place the estimated congestion level in the frame. In one configuration, the means for processing the frame for transmission includes adjusting the set of resources. In one configuration, the means for processing the frame for transmission is further configured to drop the frame when the first congestion level or the second congestion level exceeds a congestion threshold. The configuration to drop the frame corresponds to a configuration to refrain from transmitting the frame. In one configuration, the frame corresponds to a user frame and distinct from a signaling data frame. In one configuration, the means for processing the frame for transmission includes triggering a back-off request when the first congestion level or the second congestion level exceeds a congestion threshold. In one configuration, the apparatus may further include means adjusting one or more application layer parameters based on the first congestion level and the second congestion level. In one configuration, the means for adjusting the one or more application layer parameters includes adjusting a data packet generation rate parameter. In one configuration, the means for adjusting the one or more application layer parameters includes adjusting a packet size parameter that limits the amount of information placed into a data packet.

In further configuration, the apparatus 802/802' for wireless communication includes means for generating a data packet that includes at least one of a destination parameter or a source parameter. In addition, the apparatus includes means for adjusting one or more radio resource parameters based on the at least one of the destination parameter or the source parameter. In addition, the apparatus includes means for transmitting one or more data packets according to the one or more adjusted radio resource parameters. In one configuration, the one or more radio resource parameters include a designated channel or a designated carrier frequency. In one configuration, the data packet that includes at least one of a destination parameter and a source parameter further includes a back-off request.

The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   determining at least one priority parameter associated with a data packet, the at least one priority parameter including a first parameter that indicates an expiration of the data packet and a second parameter that indicates a transmission classification of the data packet, wherein the first parameter includes a date stamp that indicates the age of the data packet, wherein the second parameter includes one of a drop expired packet indication or a transmit expired packet indication;
   determining whether the data packet has expired based on the first parameter; and
   adjusting a transmission of the data packet based on the determination of whether the data packet has expired, wherein the adjusting the transmission of the data packet is based on the second parameter.

2. The method of claim 1, further comprising dropping the data packet upon determining that the data packet has expired, wherein dropping the data packet corresponds to refraining from transmitting the data packet.

3. The method of claim 1, further comprising transmitting the data packet, upon determining that the data packet is not expired and based on the second parameter.

4. The method of claim 1, wherein the second parameter includes congestion thresholds for determining whether to drop the data packet or to transmit the data packet based on a congestion level.

5. The method of claim 4, wherein the congestion thresholds include at least three levels.

6. The method of claim 1, wherein the UE is coupled to a vehicle as part of a proximity-based service.

7. A user equipment (UE) for wireless communication, comprising:
   means for determining at least one priority parameter associated with a data packet, the at least one priority parameter including a first parameter that indicates an expiration of the data packet and a second parameter that indicates a transmission classification of the data packet, wherein the first parameter includes a date stamp that indicates the age of the data packet, wherein the second parameter includes one of a drop expired packet indication or a transmit expired packet indication;
   means for determining whether the data packet has expired based on the first parameter; and
   means for adjusting a transmission of the data packet based on the determination of whether the data packet has expired, wherein the means for adjusting the transmission of the data packet is based on the second parameter.

8. The UE of claim 7, further comprising means for dropping the data packet upon determining that the data packet has expired, wherein the means for dropping the data packet is configured to refrain from transmitting the data packet.

9. The UE of claim 7, further comprising means for transmitting the data packet upon determination that the data packet is not expired and based on the second parameter.

10. The UE of claim 7, wherein the second parameter includes congestion thresholds for determining whether to drop the data packet or to transmit the data packet based on a congestion level.

11. The UE of claim 10, wherein the congestion thresholds include at least three levels.

12. The UE of claim 7, wherein the UE is coupled to a vehicle as part of a proximity-based service.

13. A user equipment (UE) for wireless communication, comprising:
   a memory; and
   at least one processor coupled to the memory and configured to:
      determine at least one priority parameter associated with a data packet, the at least one priority parameter including a first parameter that indicates an expiration of the data packet and a second parameter that indicates a transmission classification of the data packet, wherein the first parameter includes a date stamp that indicates the age of the data packet, wherein the second parameter includes one of a drop expired packet indication or a transmit expired packet indication;
      determine whether the data packet has expired based on the first parameter; and
      adjust a transmission of the data packet based on the determination of whether the data packet has expired, wherein to adjust the transmission of the data packet based on the second parameter.

14. The UE of claim 13, wherein the at least one processor is further configured to drop the data packet upon determination that the data packet has expired, wherein the configuration to drop the data packet corresponds to a configuration to refrain from transmitting the data packet.

15. The UE of claim 13, wherein the at least one processor is further configured to transmit the data packet upon determination that the data packet is not expired and based on the second parameter.

16. The UE of claim 13, wherein the second parameter includes congestion thresholds for determining whether to drop the data packet or to transmit the data packet based on a congestion level.

17. The UE of claim 16, wherein the congestion thresholds include at least three levels.

18. The UE of claim 13, wherein the UE is coupled to a vehicle as part of a proximity-based service.

19. A non-transitory computer-readable medium storing computer executable code for a user equipment (UE), comprising code to:
   determine, at a UE, at least one priority parameter associated with a data packet, the at least one priority parameter includes a first parameter that indicates an expiration of the data packet and a second parameter that indicates a transmission classification of the data packet, wherein the first parameter includes a date stamp that indicates the age of the data packet, wherein the second parameter includes one of a drop expired packet indication or a transmit expired packet indication;
   determine whether the data packet has expired based on the first parameter; and
   adjust a transmission of the data packet based on the determination of whether the data packet has expired, wherein to adjust the transmission of the data packet based on the second parameter.

* * * * *